United States Patent
Farges et al.

(10) Patent No.: US 10,316,966 B2
(45) Date of Patent: Jun. 11, 2019

(54) BIOMETRIC SHIFTER FOR A VEHICLE

(71) Applicant: Dura Operating, LLC, Auburn Hills, MI (US)

(72) Inventors: Thomas Farges, Gometz le Chatel (FR); Cumhur Unveren, Commerce Township, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 189 days.

(21) Appl. No.: 15/380,223

(22) Filed: Dec. 15, 2016

(65) Prior Publication Data

US 2018/0172145 A1    Jun. 21, 2018

(51) Int. Cl.

| | |
|---|---|
| *B60R 25/25* | (2013.01) |
| *F16H 59/02* | (2006.01) |
| *F16H 61/22* | (2006.01) |
| *B60R 25/045* | (2013.01) |
| *B60R 25/06* | (2006.01) |
| *F16H 59/10* | (2006.01) |
| *F16H 59/08* | (2006.01) |

(52) U.S. Cl.
CPC ........... *F16H 61/22* (2013.01); *B60R 25/045* (2013.01); *B60R 25/066* (2013.01); *B60R 25/25* (2013.01); *F16H 59/0278* (2013.01); *F16H 59/10* (2013.01); *F16H 2059/0282* (2013.01); *F16H 2059/081* (2013.01)

(58) Field of Classification Search
CPC ..... B60R 25/25; B60R 25/252; B60R 25/066; F16H 59/04; F16H 59/08; F16H 59/10; G06K 2009/00932; G06K 9/00006
See application file for complete search history.

(56) References Cited

U.S. PATENT DOCUMENTS

| | | | |
|---|---|---|---|
| 7,171,026 B2 | 1/2007 | Shinada et al. | |
| 7,881,506 B2 | 2/2011 | Nagasaka et al. | |
| 9,835,245 B2* | 12/2017 | Lee | F16H 59/08 |
| 2002/0145535 A1 | 10/2002 | Flick | |
| 2003/0029261 A1* | 2/2003 | DeJonge | B60K 37/06 |
| | | | 74/335 |
| 2003/0086588 A1 | 5/2003 | Shinada et al. | |
| 2004/0041689 A1 | 3/2004 | DeBono | |
| 2011/0025488 A1* | 2/2011 | Leon | B60K 37/06 |
| | | | 340/456 |
| 2011/0160969 A1* | 6/2011 | Oguri | F16H 61/66259 |
| | | | 701/52 |
| 2012/0050010 A1 | 3/2012 | Largue | |

(Continued)

FOREIGN PATENT DOCUMENTS

| | | | | |
|---|---|---|---|---|
| CN | 205078759 U | * | 3/2016 | ............. F16H 59/12 |
| EP | 1654984 A2 | | 5/2006 | |
| WO | 2004090786 A2 | | 10/2004 | |

*Primary Examiner* — Tisha D Lewis
(74) *Attorney, Agent, or Firm* — Robert E. Ford; Raymond J. Vivacqua; Steven L. Crane (57) ABSTRACT

A biometric shifter for a vehicle includes a shifter body having an outer surface with a grip portion configured to be gripped by an operator's hand, the shifter body defining a chamber, the grip portion having an opening that communicates with the chamber, a vein reader sensor disposed within the chamber at a first distance from the opening in the grip portion, wherein the first distance is configured to optimize biometric verification of an operator's hand on the grip portion of the shifter body.

19 Claims, 7 Drawing Sheets

(56) References Cited

U.S. PATENT DOCUMENTS

2013/0302761 A1\* 11/2013 Best .................... G09B 19/167
                                                    434/71
2014/0125502 A1    5/2014 Wittkop et al.
2015/0281214 A1   10/2015 Shirai et al.
2016/0138705 A1\*  5/2016 Kim .................... F16H 59/0217
                                                    74/473.2
2017/0120930 A1\*  5/2017 Ling .................... B60W 50/10

\* cited by examiner

BIOMETRIC SHIFTER FOR A VEHICLE

FIELD

The invention relates generally to a biometric shifter for a vehicle, and more particularly to a biometric shifter housing a palm vein sensor for performing operating functions in the vehicle.

BACKGROUND

The statements in this section merely provide background information related to the present disclosure and may or may not constitute prior art.

Motor vehicles have been designed with increasingly advanced technologies aimed at improving the safety, efficiency, and performance of the motor vehicle. An example of such technologies includes biometric control systems. Biometric control systems pair biometric sensors with vehicle functions in order to improve ease of use/access to the vehicle. One example of a biometric control system is a fingerprint scanner used to unlock or turn on a vehicle. The fingerprint scanner senses or reads the fingerprint biometric data of a user. This biometric data is then compared to pre-registered biometric data to determine if the user is authorized to operate the vehicle. However, fingerprint scanners may have trouble detecting the biometric data of the user due to limits in the technology. Another type of biometric sensor is the vein reader sensor which detects the vein pattern of a user. The vein reader sensor is typically more reliable and faster than a fingerprint sensor. However, the vein reader sensor uses infrared emissions and reflections and thus requires a specific distance between the sensor and the operator's hand. Accordingly, there is a need in the art to provide a biometric control system that utilizes vein reader sensor technology that functions with vehicle design requirements.

SUMMARY

A biometric shifter for a vehicle is provided. The biometric shifter includes a shifter body having an outer surface with a grip portion configured to be gripped by an operator's hand, the shifter body defining a chamber, the grip portion having an opening that communicates with the chamber, a vein reader sensor disposed within the chamber at a first distance from the opening in the grip portion, wherein the first distance is configured to optimize biometric verification of an operator's hand on the grip portion of the shifter body.

In one aspect, the biometric shifter includes a window disposed overtop the opening in the grip portion, wherein the window is transparent to infrared radiation.

In another aspect, the opening in the grip portion is free from material.

In another aspect, a location of the opening in the grip portion is configured to align the opening with the palm of the operator's hand when gripping the grip portion.

In another aspect, the first distance is approximately 50 mm.

In another aspect, the window has a longitudinal width greater than the first distance.

In another aspect, the longitudinal width of the window is approximately 100 mm.

In another aspect, the vein reader sensor is in communication with a controller having memory for storing a biometric template, and the controller is configured to compare sensor data from the vein reader sensor to the biometric template to activate at least one function if the sensor data matches the biometric template.

In another aspect, the at least one function includes unlocking the biometric shifter to allow the biometric shifter to move.

In another aspect, the at least one function includes enabling the ignition of the vehicle.

In another aspect, the at least one function includes activating one or more operator preferences associated with the biometric template.

In another aspect, the shifter body is translatable in a longitudinal direction between at least a Park position, a Neutral position, a Reverse position, and a Drive position.

In another aspect, the shifter body is rotatable about an axis between at least a Park position, a Neutral position, a Reverse position, and a Drive position.

In another aspect, a button is disposed proximate the grip portion for unlocking the biometric shifter.

Another example of a biometric shifter for a vehicle is provide that includes a shifter base defining a chamber and having an opening in communication with the chamber, a shifter knob connected to the shifter base and moveable with respect to the shifter base between at least a first position and a second position, the shifter knob having an outer surface with a grip portion configured to be gripped by an operator's hand, the shifter knob having an aperture that extends through the shifter knob, wherein the opening and the aperture are in alignment when the shifter knob is in the first position, and a vein reader sensor disposed within the chamber and configured to allow the shifter knob to move from the first position to the second position when a recognized biometric reading is sensed by the vein reader sensor.

In one aspect, the shifter knob rotates about an axis coincident with the vein reader sensor.

In another aspect, the shifter knob is translatable between a depressed position and an extended position, wherein the shifter knob translates from the depressed position to the extended position when a recognized biometric reading is sensed by the vein reader sensor.

In another aspect, the shifter knob is translatable between the first position and the second position.

In another aspect, the vein reader sensor is disposed within the chamber at a first distance from the aperture in the outer surface of the grip portion, wherein the first distance is configured to optimize biometric verification of an operator's hand on the grip portion of the shifter knob.

Yet another example of a biometric shifter for a vehicle is provided that includes a shifter body having an outer surface with a grip portion configured to be gripped by an operator's hand, the shifter body defining a chamber, the grip portion having an opening that communicates with the chamber, wherein at least the grip portion is moveable between at least a Park position, a Neutral position, a Reverse position, and a Drive position, a vein reader sensor disposed within the chamber at a distance from the opening in the grip portion, wherein the vein reader sensor senses a biometric vein image of an operator's hand on the grip portion of the shifter body, and a controller in communication with the vein reader sensor and having memory for storing a biometric template. The controller is configured to compare the biometric vein image from the vein reader sensor to the biometric template to activate at least one function if the biometric vein image matches the biometric template. The at least one function includes unlocking the biometric shifter to allow the grip portion to move, enabling the ignition of the vehicle, or activating one or more operator preferences associated with the biometric template Further aspects, examples, and advantages will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views.

DETAILED DESCRIPTION

The following description is merely exemplary in nature and is not intended to limit the present disclosure, application or uses.

Figure 1:
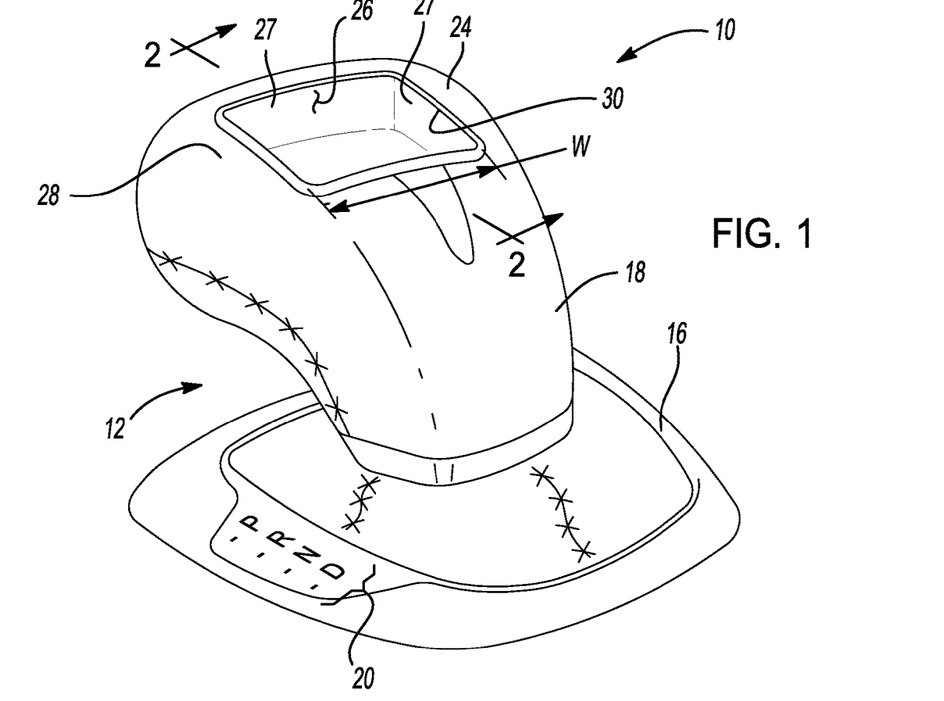
FIG. 1 is a perspective view of an example of a biometric shifter according to the principles of the present disclosure.
Figure 2:
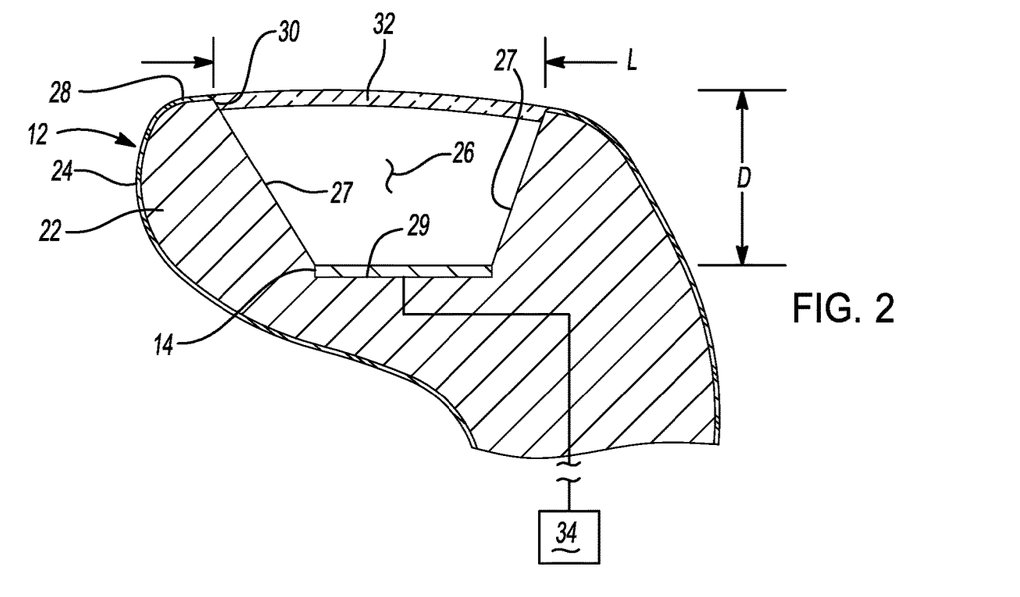
FIG. 2 is a cross section view of the biometric shifter viewed in the direction of arrow 2-2 in FIG. 1.

With reference to FIGS. 1 and 2, a first example of a biometric shifter according to the principles of the present disclosure is shown and generally indicated by reference number 10. The biometric shifter 10 is preferably used in a vehicle, for example a passenger vehicle, truck, sport utility vehicle, van, motor home, or any other type of vehicle without departing from the scope of the present disclosure. The biometric shifter 10 is operable to shift the motor vehicle between various operating modes. For example, the biometric shifter 10 is operable to shift between Park, Reverse, Neutral, and Drive. However, it should be appreciated that the biometric shifter 10 may be able to shift the vehicle into other operating modes, for example, manual modes and/or high gear and low gear operating modes, without departing from the scope of the present disclosure. The biometric shifter 10 generally includes a shifter 12 that houses a biometric sensor 14.

The shifter 12 includes a shifter base 16 and a shifter knob 18. The shifter base 16 is mounted within the passenger compartment of the vehicle, typically in the dashboard instrument panel or center console, so as to be accessible by an operator of the vehicle. The shifter base 16 includes an indicator panel 20 that indicates in which operating mode the biometric shifter 10 is currently engaged.

The shifter knob 18 extends out from the shifter base 16 and is moveable with respect to the shifter base 16, by pivoting, translating, or a combination of both. The shifter knob 18 includes a shifter body 22 having an outer surface 24. The shifter body 22 defines a chamber or recess 26 within the shifter body 22. The chamber 26 is free of any material and is defined by four planar side walls 27 and a bottom surface 29. In one aspect, the planar side walls 27 are angled with respect to the bottom surface 29. In another aspect, the planar side walls 27 are substantially perpendicular to the bottom surface 29. The outer surface 24 includes a grip portion 28 that is sized to be gripped by the hand of an operator of the vehicle. The grip portion 28 is disposed at a distal end of the shifter knob 18. An opening 30 is disposed in the grip portion 28 and communicates with the chamber 26. The opening 30 is preferably positioned such that an operator's hand covers the opening 30 when the operator grips the shifter knob 18. The opening 30 has a longitudinal length "L" and a transverse width "W". In one example, the length L and width W of the opening are each at least 80 mm. In another example, the length L and width W of the opening are each at least 100 mm. In one aspect, a transparent cover or window 32 is disposed in the opening 30. The window 32 is transparent to at least infrared radiation.

The biometric sensor 14 is disposed within the chamber 26 of the shifter knob 18. In one example, the biometric sensor 14 is disposed on the bottom surface 29 of the chamber 26. The biometric sensor 14 is coincident with the opening 30. The biometric sensor 14 is a distance "D" from an imaginary plane that is coplanar with the outer surface 24. The distance D is selected to optimize the capability of the biometric sensor 14 to sense biometric data at approximately the distance D. In one aspect, the distance D is approximately 50 mm.

The biometric sensor 14 is preferably a vein reader sensor that emits infrared radiation and detects reflected radiation. The biometric sensor 14 is in electronic communication with a controller 34. The controller 34 may be packaged with the biometric shifter 10 or be a vehicle control module, such as a body control module, engine control module, transmission control module, etc. Generally, the controller 34 is a non-generalized, electronic control device having a preprogrammed digital computer or processor, memory or non-transitory computer readable medium used to store data such as control logic, instructions, lookup tables, biometric data, driver preferences, etc., and a plurality of input/output peripherals or ports. The processor is configured to execute the control logic or instructions. The controller 34 is configured to execute, or command/request execution of, various functions within the vehicle based on biometric data sensed by the biometric sensor 14. These functions may include, for example, starting the motor vehicle, unlocking the shifter knob 18 for movement out of park, activating driver preferences related to seat position, side view mirror position, etc.

For example, when an operator of the vehicle grips the shifter knob 18, the operator's palm is disposed overtop the opening 30. The grip portion 28 keeps the palm at approximately the distance D, thereby optimizing the ability of the biometric sensor 14 to sense the biometric data. The biometric sensor 14 wakes from a sleep mode and scans and detects the vein pattern of the operator's palm or fingers. The sensed vein pattern is then digitized as a template of biometric data and compared to stored biometric data templates associated with authorized operators of the vehicle. If there is a template match the controller 34 commands one or more functions. If there is not a template match the controller 34 sends an identification fail command to the vehicle.

Turning now to FIGS. 3A-4B, another example of a biometric shifter according to the principles of the present disclosure is indicated by reference number 110. The biometric shifter 110 is similar to the biometric shifter 10 and therefore like components are indicated by like reference numbers. The biometric shifter 110 includes a rotary shifter 112 and the biometric sensor 14. The rotary shifter 112 includes a shifter housing or base 116 and a shifter knob 118. The shifter base 116 is mounted within the passenger compartment of the vehicle, typically in the dashboard instrument panel or center console, so as to be accessible by an operator of the vehicle. The shifter base 116 defines a chamber or recess 120. The shifter base 116 further includes a top plate 122 connected thereto. The top plate 122 includes an opening 124 that extends through the top plate 122 to communicate with the chamber 120. The biometric sensor 14 is disposed within the chamber 120 of the shifter base 116 such that the biometric sensor 14 is in alignment with the opening 124 of the top plate 122.

Figure 3A:
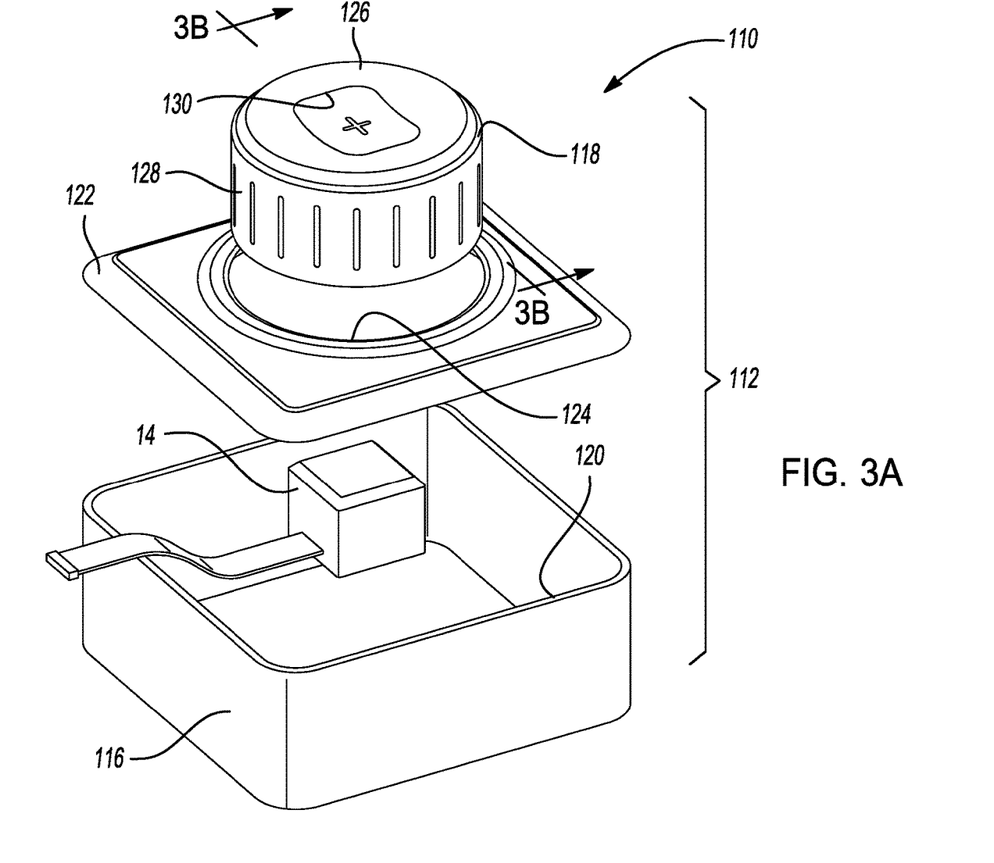
FIG. 3A is a perspective, exploded view of another example of a biometric shifter according to the principles of the present disclosure.
Figure 3B:
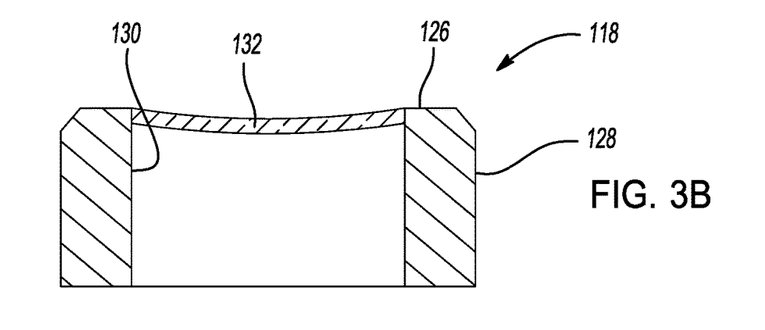
FIG. 3B is a cross section view of the biometric shifter viewed in the direction of arrow 3B-3B in FIG. 3A.

The shifter knob 118 is mounted to the shifter base 116 and is rotatable about an axis and translatable with respect to the shifter base 116. The shifter knob 118 is generally cylindrical and has an outer surface 126. The outer surface 126 includes a grip portion 128 that is sized to be gripped by the hand of an operator of the vehicle. The grip portion 128 is disposed around the shifter knob 118. An opening 130 is disposed in the outer surface 126 between the grip portion 128. As best seen in FIG. 3B, the opening 130 extends through the shifter knob 118. The opening 130 thus communicates through the opening 124 in the top plate 122 with the chamber 120 of the shifter base 116. The opening 130 is preferably positioned such that an operator's hand covers the opening 130 when the operator grips the grip portion 128 of the shifter knob 118. The opening 130 may be sized similarly to the opening 30 in the shifter knob 118. In one aspect, a transparent cover or window 132 is disposed in the opening 130. The window 132 is transparent to at least infrared radiation.

Figure 4A:
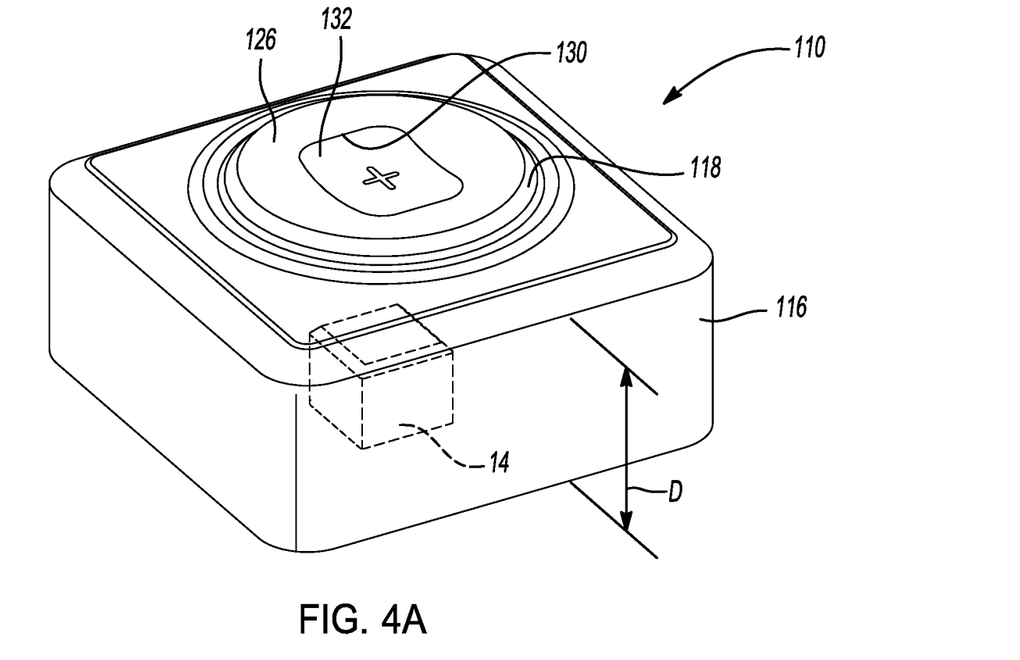
FIG. 4A is a perspective view of the biometric shifter with a shifter knob in a first position.
Figure 4B:
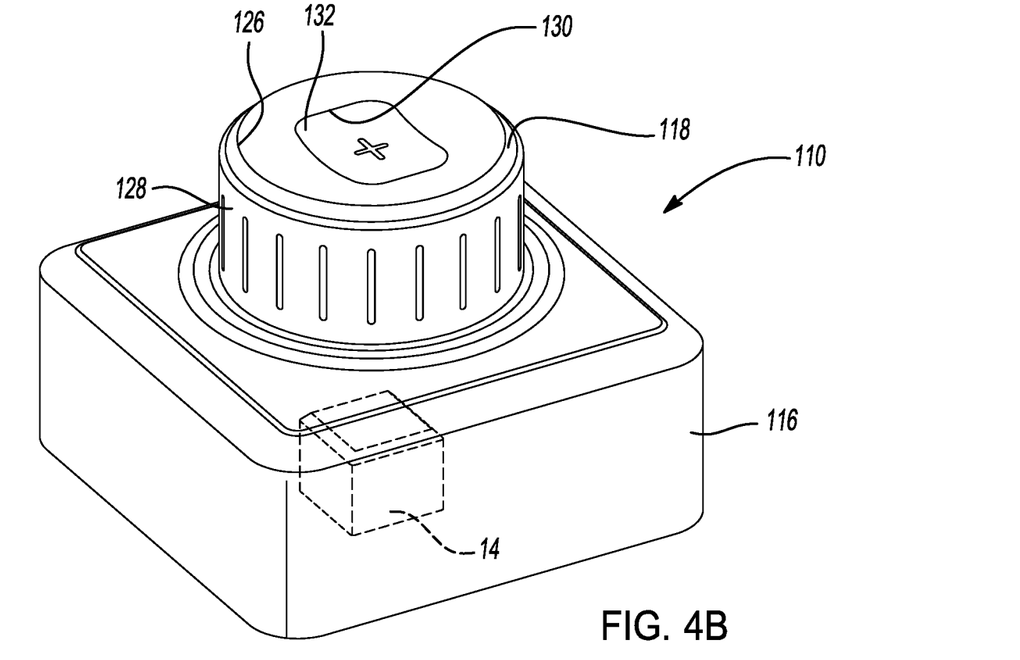
FIG. 4B is a perspective view of the biometric shifter with a shifter knob in a second position.

The shifter knob 118 is translatable between a recessed position, shown in FIG. 4A, and an extended position, shown in FIG. 4B. In the recessed position, the grip portion 128 of the shifter knob 118 is disposed within the shifter base 116. In the extended position, the grip portion 128 of the shifter knob 118 is exposed and an operator of the vehicle can rotate the shifter knob 118 between various positions, including, for example, a park position, reverse position, a neutral position, and a drive position. In one aspect, when the shifter knob 118 is in the recessed position, the outer surface 126 proximate the opening 130 is the distance "D" from the biometric sensor 14. The distance D is selected to optimize the capability of the biometric sensor 14 to sense biometric data at approximately the distance D. In one aspect, the distance D is approximately 50 mm. In another aspect, the shifter knob 118 moves from the recessed position to the extended position when the biometric sensor 14 detects an authorized user.

Figure 5:
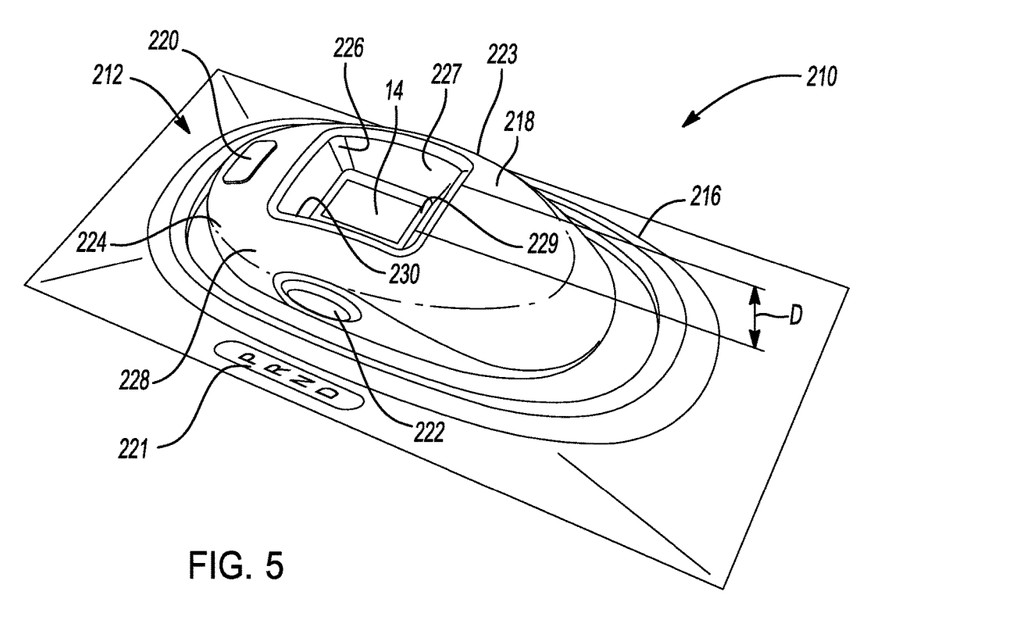
FIG. 5 is a perspective view of another example of a biometric shifter according to the principles of the present disclosure.

With reference to FIG. 5, yet another example of a biometric shifter according to the principles of the present disclosure is indicated by reference number 210. The biometric shifter 210 is similar to the biometric shifter 10 and therefore like components are indicated by like reference numbers. The biometric shifter 210 includes a mouse shifter 212 and the biometric sensor 14. The mouse shifter 212 includes a shifter base 216 and a shifter knob 218. The shifter base 216 is mounted within the passenger compartment of the vehicle, typically in the dashboard instrument panel or center console, so as to be accessible by an operator of the vehicle. The shifter base 216 includes an indicator panel 221 that indicates in which operating mode the biometric shifter 210 is currently engaged.

The shifter knob 218 is moveable with respect to the shifter base 216 by translating in a longitudinal direction between various positions, including a Park position, a Reverse position, a Neutral position, and a Drive position. The shifter knob 218 further includes a Park button 220 and an unlock button 222. Pressing both the Park button 220 and the unlock button 222 allows the shifter knob 218 to be moved out of Park. The shifter knob 218 includes a shifter body 223 having an outer surface 224. The shifter body 223 defines a chamber or recess 226 within the shifter body 223. The chamber 226 is free of any material and is defined by four planar side walls 227 and a bottom surface 229. In one aspect, the planar side walls 227 are angled with respect to the bottom surface 229. In another aspect, the planar side walls 227 are substantially perpendicular to the bottom surface 229. The outer surface 224 includes a grip portion 228 that is sized to be gripped by the hand of an operator of the vehicle, similar to a computer mouse. An opening 230 is disposed in the grip portion 228 and communicates with the chamber 226. The opening 230 is preferably positioned such that an operator's hand covers the opening 230 when the operator grips the shifter knob 218. The opening 230 has dimensions similar to the opening 30.

The biometric sensor 14 is disposed within the chamber 226 of the shifter knob 218. In one example, the biometric sensor 14 is disposed on the bottom surface 229 of the chamber 226. The biometric sensor 14 is coincident or in alignment with the opening 230. The biometric sensor 14 is a distance "D" from an imaginary plane that is coplanar with the outer surface 224. The distance D is selected to optimize the capability of the biometric sensor 14 to sense biometric data at approximately the distance D. In one aspect, the distance D is approximately 50 mm. Thus, when an operator's hand grips the mouse shifter 212, the palm of the operator's hand is approximately at the distance D from the biometric sensor.

Figure 6:
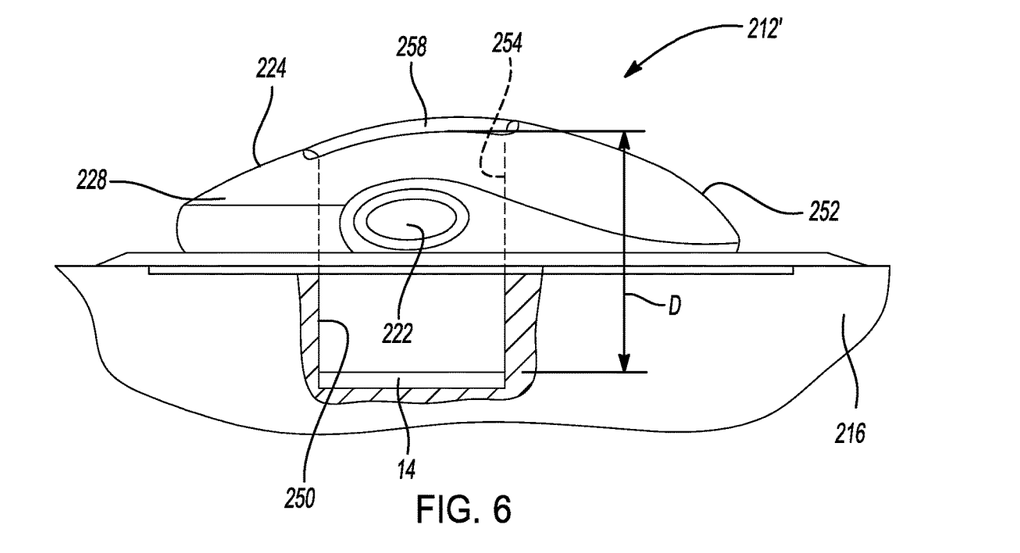
FIG. 6 is a side, partial cross section view of the biometric shifter.

With reference to FIG. 6, and alternate embodiment of the mouse shifter 212 is indicated by reference number 212'. The mouse shifter 212' is substantially similar to the mouse shifter 212 and like components are indicated by like reference numbers. However, in the mouse shifter 212', the biometric sensor 14 is disposed in a chamber 250 disposed in the shifter base 216. Also, the shifter knob 218 is replaced with a shifter knob 252 that defines an opening 254 that extends through the shifter knob 252. The opening 254 communicates with the chamber 250 of the shifter base 216.

The opening 254 is in alignment with the chamber 250 when the shifter knob 252 is at least in the Park position. In one aspect, a transparent cover or window 258 is disposed in the opening 254. The window 258 is transparent to at least infrared radiation.

Figure 7:
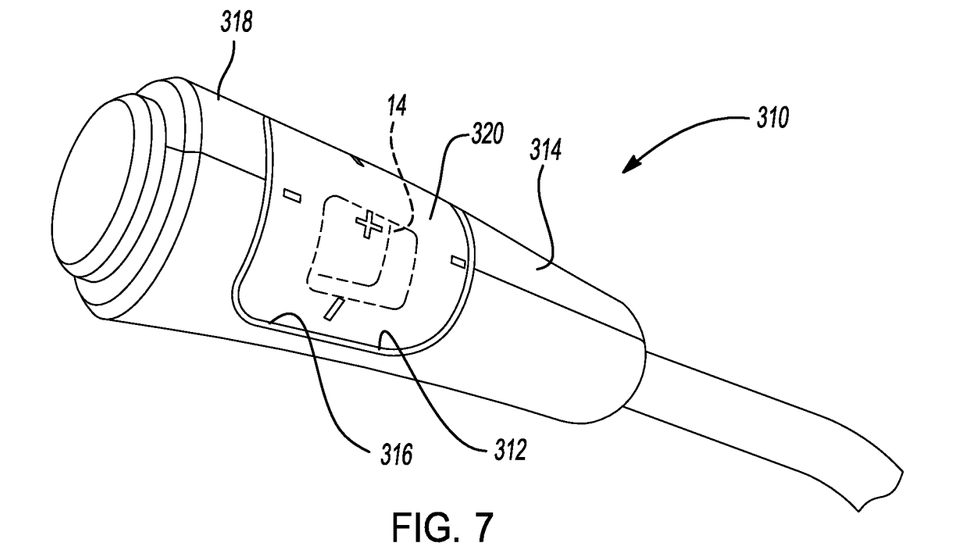
FIG. 7 is a perspective view of another example of a biometric shifter according to the principles of the present disclosure.
Figure 8:
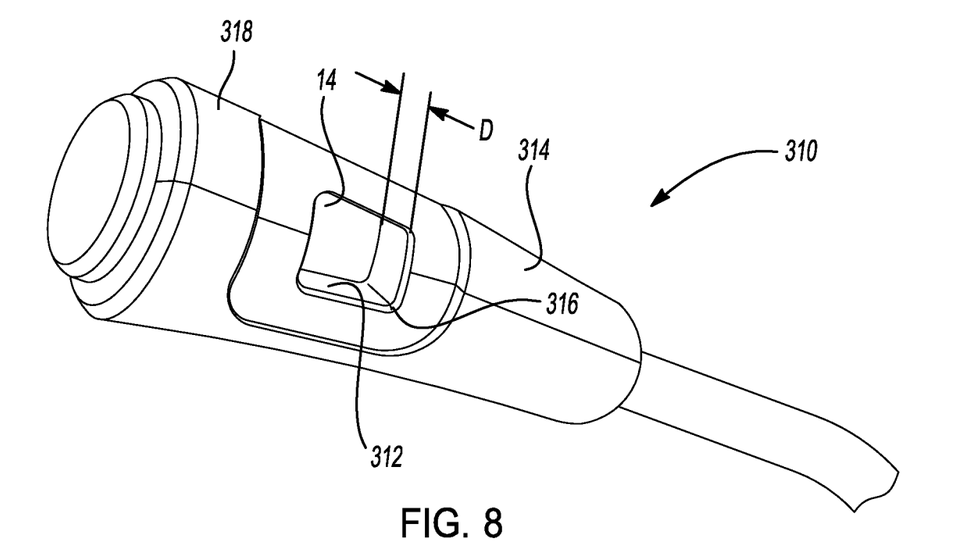
FIG. 8 is a perspective view of yet another example of a biometric shifter according to the principles of the present disclosure

Turning to FIGS. 7-8, an example of the biometric shifter is illustrated as a column shifter and indicated by reference number 310. The biometric shifter 310 is similar to the biometric shifter 10 and generally includes the biometric sensor 14 disposed within a chamber 312 of a column shifter housing 314. An opening 316 is formed in an outer surface 318 of the column shifter housing 314 that communicates with the chamber 312. The biometric sensor 14 is disposed the distance "D" from the outer surface 318 of the column shifter housing 314. The distance D is selected to optimize the capability of the biometric sensor 14 to sense biometric data at approximately the distance D, as noted above. In one aspect, a transparent cover or window 320 is disposed in the opening 316, as shown in FIG. 7. The window 320 is transparent to at least infrared radiation. In another aspect, the opening 316 does not include a window, as shown in FIG. 8.

Figure 9A:
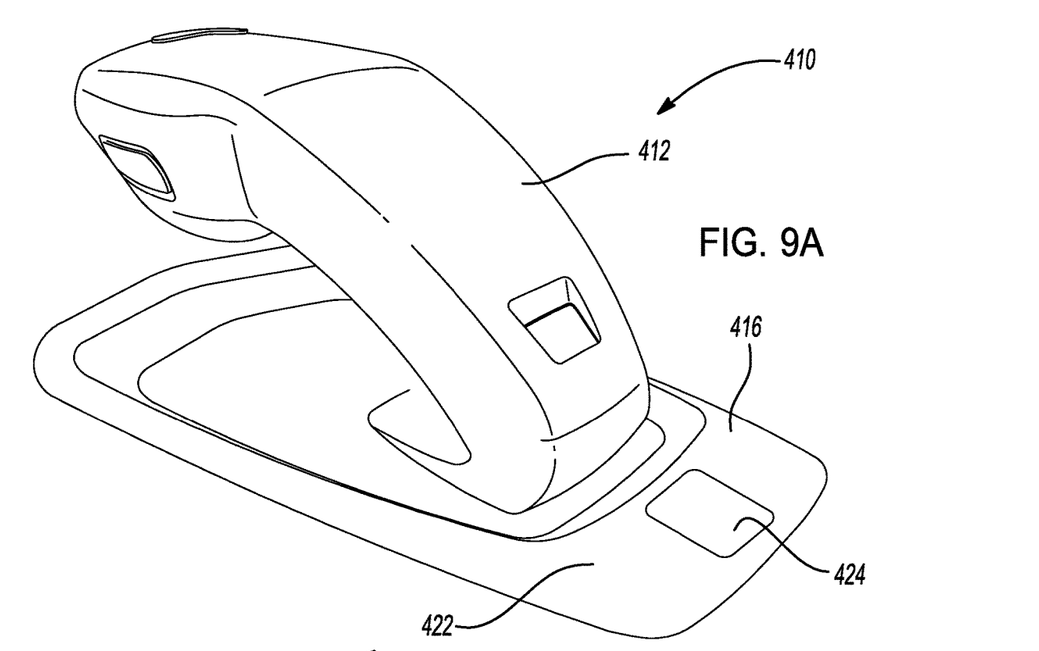
FIG. 9A is a perspective view of another example of a biometric shifter according to the principles of the present disclosure with a cover in a closed position.
Figure 9B:
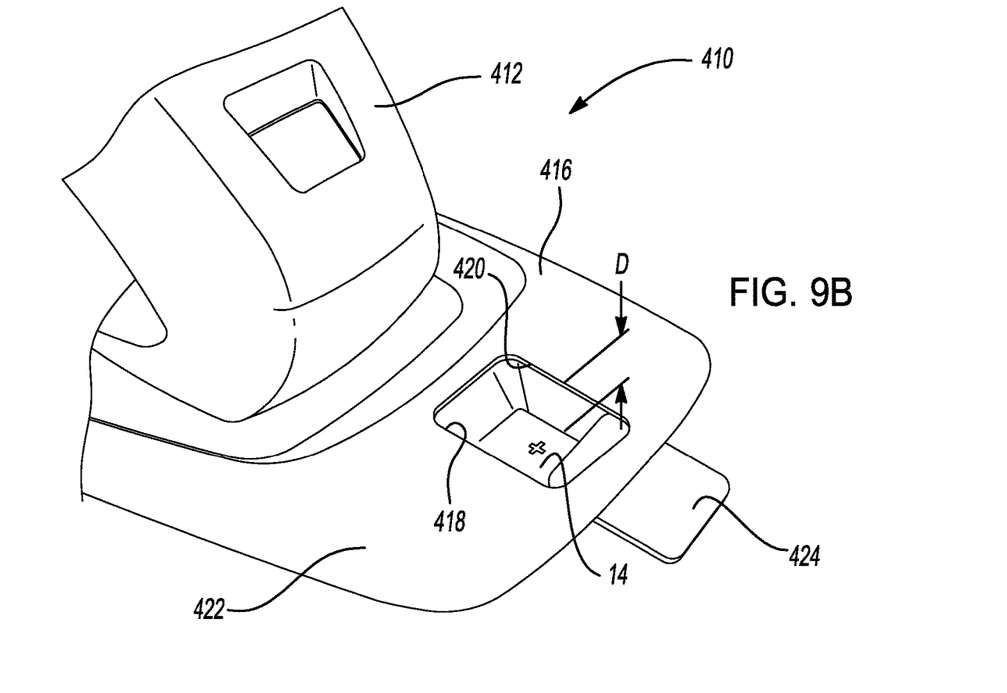
FIG. 9B is a perspective view of the biometric shifter with the cover in an open position.
Figures 9C, 10A, 10B:
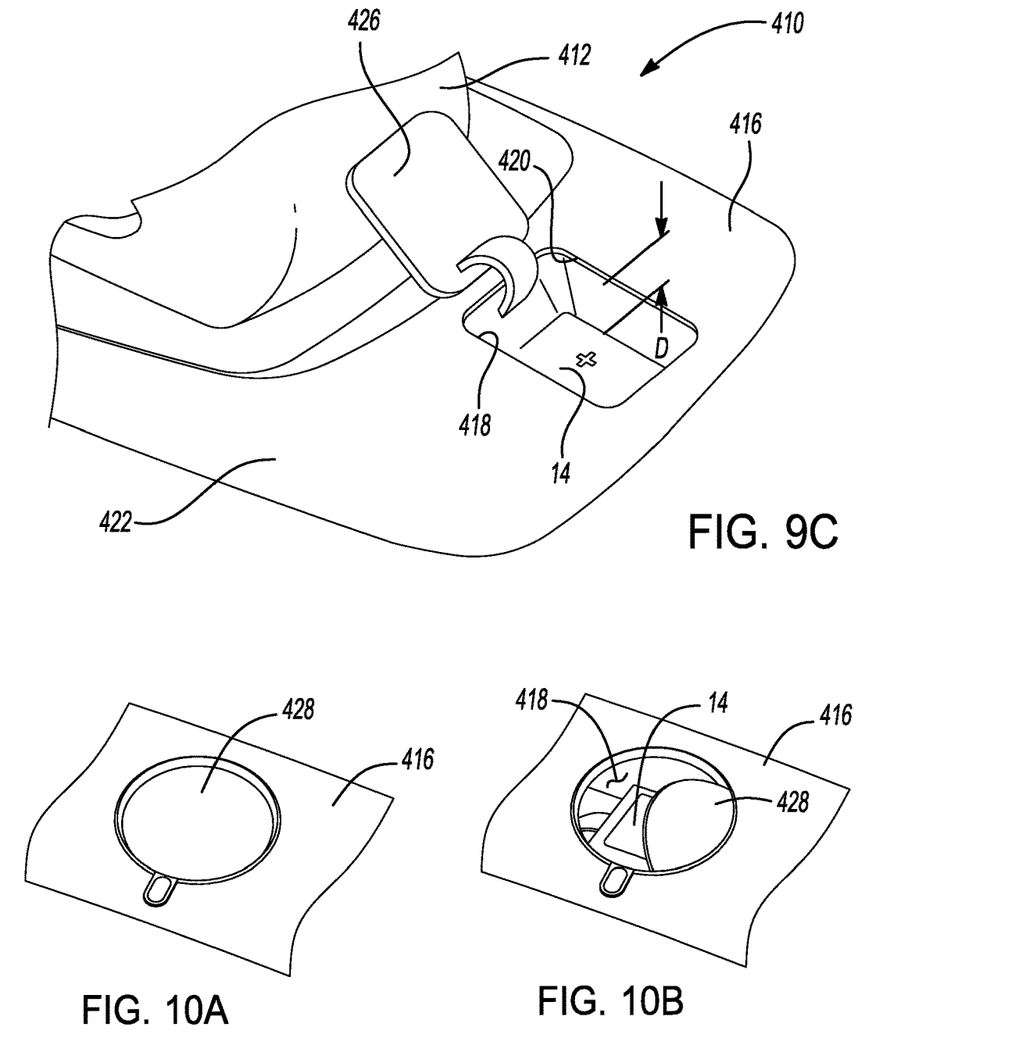
FIG. 9C is a perspective view of another example of a biometric shifter according to the principles of the present disclosure with a hatch in an open position.
FIG. 10A is a perspective view of another example of a biometric shifter according to the principles of the present disclosure with a surface cover in a closed position.
FIG. 10B is a perspective view of the biometric shifter with the surface cover in an intermediate position.
Figure 10C:
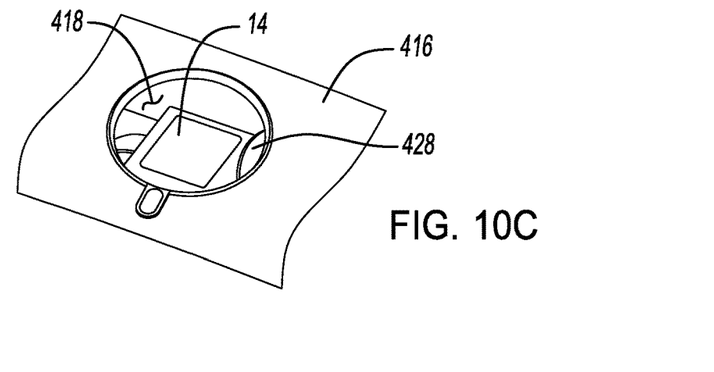
FIG. 10C is a perspective view of the biometric shifter with the surface cover in an open position.

With reference to FIGS. 9A-9B, another example of the biometric shifter is illustrated and indicated by reference number 410. The biometric shifter 410 is similar to the biometric shifter 10 and generally includes a moveable shifter knob 412, a shifter base 416, and the biometric sensor 14. However, the biometric sensor 14 is packaged separately from the shifter knob 412. Instead, the biometric sensor 14 is disposed in a chamber 418 in the shifter base 416. An opening 420 that communicates with the chamber 418 is formed in an outer surface 422 of the shifter base 416. A slidable cover 424 protects the biometric sensor 14 from the environment when not in use. The biometric sensor 14 is disposed the distance "D" from the outer surface 422. In an alternate embodiment, the slidable cover 424 is replaced with a pivoting hatch 426, as shown in FIG. 9C. The hatch 426 pivots up and away from the shifter base 416 to access the biometric sensor 14. In yet another alternate embodiment, the slidable cover 424 is replaced with a rotating surface cover 428. The rotating surface cover 428 rotates within the chamber 418 to expose the biometric sensor 14 for use.

The description of the invention is merely exemplary in nature and variations that do not depart from the gist of the invention are intended to be within the scope of the invention. Such variations are not to be regarded as a departure from the spirit and scope of the invention.

The following is claimed:

1. A biometric shifter for a vehicle, the biometric shifter comprising:
    a shifter body having an outer surface with a grip portion configured to be gripped by an operator's hand, the shifter body defining a chamber, the grip portion having an opening that communicates with the chamber; and
    a vein reader sensor disposed within the chamber at a first distance from the opening in the grip portion,
    wherein the first distance is configured to optimize biometric verification of an operator's hand on the grip portion of the shifter body.

2. The biometric shifter of claim 1 further comprising a window disposed overtop the opening in the grip portion, wherein the window is transparent to infrared radiation.

3. The biometric shifter of claim 1 wherein the opening in the grip portion is free from material.

4. The biometric shifter of claim 1 wherein a location of the opening in the grip portion is configured to align the opening with the palm of the operator's hand when gripping the grip portion.

5. The biometric shifter of claim 1 wherein the first distance is approximately 50 mm.

6. The biometric shifter of claim 1 wherein the window has a longitudinal width greater than the first distance.

7. The biometric shifter of claim 6 wherein the longitudinal width of the window is approximately 100 mm.

8. The biometric shifter of claim 1 wherein the vein reader sensor is in communication with a controller having memory for storing a biometric template, and the controller is configured to compare sensor data from the vein reader sensor to the biometric template to activate at least one function if the sensor data matches the biometric template.

9. The biometric shifter of claim 8 wherein the at least one function includes unlocking the biometric shifter to allow the biometric shifter to move.

10. The biometric shifter of claim 8 wherein the at least one function includes enabling the ignition of the vehicle.

11. The biometric shifter of claim 8 wherein the at least one function includes activating one or more operator preferences associated with the biometric template.

12. The biometric shifter of claim 1 wherein the shifter body is translatable in a longitudinal direction between at least a Park position, a Neutral position, a Reverse position, and a Drive position.

13. The biometric shifter of claim 1 wherein the shifter body is rotatable about an axis between at least a Park position, a Neutral position, a Reverse position, and a Drive position.

14. The biometric shifter of claim 1 further comprising a button disposed proximate the grip portion for unlocking the biometric shifter.

15. A biometric shifter for a vehicle comprising:
    a shifter base defining a chamber and having an opening in communication with the chamber;
    a shifter knob connected to the shifter base and moveable with respect to the shifter base between at least a first position and a second position, the shifter knob having an outer surface with a grip portion configured to be gripped by an operator's hand, the shifter knob having an aperture that extends through the shifter knob, wherein the opening and the aperture are in alignment when the shifter knob is in the first position; and
    a vein reader sensor disposed within the chamber and configured to allow the shifter knob to move from the first position to the second position when a recognized biometric reading is sensed by the vein reader sensor, and wherein the vein reader sensor is disposed within the chamber at a first distance from the aperture in the outer surface of the grip portion, wherein the first distance is configured to optimize biometric verification of an operator's hand on the grip portion of the shifter knob.

16. The biometric shifter of claim 15 wherein the shifter knob rotates about an axis coincident with the vein reader sensor.

17. The biometric shifter of claim 16 wherein the shifter knob is translatable between a depressed position and an extended position, wherein the shifter knob translates from the depressed position to the extended position when a recognized biometric reading is sensed by the vein reader sensor.

18. The biometric shifter of claim 15 wherein the shifter knob is translatable between the first position and the second position.

19. A biometric shifter for a vehicle, the biometric shifter comprising:
- a shifter body having an outer surface with a grip portion configured to be gripped by an operator's hand, the shifter body defining a chamber, the grip portion having an opening that communicates with the chamber, wherein at least the grip portion is moveable between at least a Park position, a Neutral position, a Reverse position, and a Drive position;
- a vein reader sensor disposed within the chamber at a distance from the opening in the grip portion, wherein the vein reader sensor senses a biometric vein image of an operator's hand on the grip portion of the shifter body; and
- a controller in communication with the vein reader sensor and having memory for storing a biometric template, wherein the controller is configured to compare the biometric vein image from the vein reader sensor to the biometric template to activate at least one function if the biometric vein image matches the biometric template, wherein the at least one function includes unlocking the biometric shifter to allow the grip portion to move, enabling the ignition of the vehicle, or activating one or more operator preferences associated with the biometric template.

* * * * *